(12) United States Patent
Blanckaert et al.

(10) Patent No.: US 9,696,146 B2
(45) Date of Patent: Jul. 4, 2017

(54) OPTICAL SCANNING PROBE

(71) Applicant: NIKON METROLOGY NV, Heverlee (BE)

(72) Inventors: Patrick Blanckaert, Boortmeerbeek (BE); Frank Thys, Willebroek (BE); Raf Nysen, Veltem-Beisem (BE); Geert Vandenhoudt, Kessel-Lo (BE)

(73) Assignee: NIKON METROLOGY NV, Heverlee (BE)

( * ) Notice: Subject to any disclaimer, the term of this patent is extended or adjusted under 35 U.S.C. 154(b) by 0 days.

(21) Appl. No.: 14/387,552

(22) PCT Filed: Mar. 28, 2013

(86) PCT No.: PCT/EP2013/056700
§ 371 (c)(1),
(2) Date: Sep. 24, 2014

(87) PCT Pub. No.: WO2013/144293
PCT Pub. Date: Oct. 3, 2013

(65) Prior Publication Data
US 2015/0043008 A1     Feb. 12, 2015

Related U.S. Application Data

(60) Provisional application No. 61/618,319, filed on Mar. 30, 2012, provisional application No. 61/692,109, filed on Aug. 22, 2012.

(30) Foreign Application Priority Data

Aug. 22, 2012  (EP) .................................... 12181396

(51) Int. Cl.
*G01B 11/06*    (2006.01)
*G01B 11/25*    (2006.01)

(52) U.S. Cl.
CPC ...... *G01B 11/2518* (2013.01); *G01B 11/0608* (2013.01); *G01B 11/06* (2013.01); *G01B 11/25* (2013.01); *Y10T 29/49826* (2015.01)

(58) Field of Classification Search
CPC ........................ G01B 11/0608; G01B 11/2518
(Continued)

(56) References Cited

U.S. PATENT DOCUMENTS 4,192,578 A * 3/1980 Suzuki ................... G02B 27/09
                                                    353/121
4,589,738 A * 5/1986 Ozaki .................... G02B 17/00
                                                    359/710

(Continued)

FOREIGN PATENT DOCUMENTS

JP  H09-145320 A   6/1997
JP  H09-159410 A   6/1997
(Continued)

OTHER PUBLICATIONS

International Search Report dated Jul. 3, 2013 in connection with PCT International Patent Application No. PCT/EP2013/056700, 3 pages.

(Continued)

*Primary Examiner* — Tri Ton
*Assistant Examiner* — Jarreas C Underwood
(74) *Attorney, Agent, or Firm* — Amster, Rothstein & Ebenstein LLP

(57) ABSTRACT

The present invention relates to a scanning probe (100) for the dimensional acquisition of an object (400) by irradiating the object (400) with light and detecting reflected light comprising: a detection unit (120) comprising an imaging sensor (122) and a sensor lens assembly (124) for detecting the reflected light, a light projecting unit (141) comprising a light source (142) for generating light, and source optics (Continued)

(145) for focusing the light, and light plane generating optics (143) for generating a light plane (149) for irradiating the object, and an adjustment mechanism (155) comprised in the light projecting unit (141), for adjusting the position or orientation of the light plane relative to the detection unit. It further relates to a method for assembly of a scanning probe (100).

19 Claims, 10 Drawing Sheets

(58) Field of Classification Search
USPC .... 356/237.1–241.6, 242.1–243.8, 426–431, 356/600–640
See application file for complete search history.

(56) References Cited

U.S. PATENT DOCUMENTS

| | | | | |
|---|---|---|---|---|
| 5,095,386 | A * | 3/1992 | Scheibengraber | A61B 6/08 359/668 |
| 5,102,223 | A * | 4/1992 | Uesugi | G01B 11/2522 250/550 |
| 5,105,149 | A * | 4/1992 | Tokura | G01R 31/308 348/126 |
| 5,668,631 | A * | 9/1997 | Norita | G06T 7/521 250/559.22 |
| 5,914,495 | A * | 6/1999 | Ishizuka | G01N 21/9506 250/559.39 |
| 6,064,468 | A * | 5/2000 | Sakaguchi | G03B 27/545 355/35 |
| 6,075,883 | A * | 6/2000 | Stern | G01N 21/8806 382/144 |
| 6,141,105 | A * | 10/2000 | Yahashi | G01B 11/2518 356/623 |
| 6,424,422 | B1 * | 7/2002 | Kamon | G01B 11/24 250/559.23 |
| 6,470,578 | B1 * | 10/2002 | Phuly | G01C 15/002 33/21.3 |
| 6,549,289 | B1 * | 4/2003 | Ellis | A01K 11/006 348/135 |
| 6,556,783 | B1 * | 4/2003 | Gelphman | H04N 5/232 348/E5.042 |
| 6,614,537 | B1 * | 9/2003 | Yahashi | G01B 11/24 356/3.04 |
| 7,826,048 | B2 * | 11/2010 | Holecek | G03G 15/0812 356/237.2 |
| 8,537,371 | B2 * | 9/2013 | Steffensen | G01S 17/66 356/614 |
| 2004/0201849 | A1 * | 10/2004 | Codner | G01N 21/553 356/445 |
| 2007/0097381 | A1 * | 5/2007 | Tobiason | G06T 7/521 356/604 |
| 2009/0080036 | A1 * | 3/2009 | Paterson | G01B 11/2518 358/474 |

FOREIGN PATENT DOCUMENTS

| | | |
|---|---|---|
| JP | 2003-004416 A | 1/2003 |
| JP | 2007-183181 A | 7/2007 |
| JP | 2008-256483 A | 10/2008 |
| WO | 2011156440 A1 | 12/2011 |

OTHER PUBLICATIONS

PCT Notification Concerning Transmittal of International Preliminary Report on Patentability dated Jul. 22, 2014, and Annexes, in connection with PCT International Patent Application No. PCT/EP2013/056700, 23 pages.

Japanese Office Action dated Aug. 23, 2016 in connection with Japanese Patent Application No. 2015-502353, 7 pages.

* cited by examiner

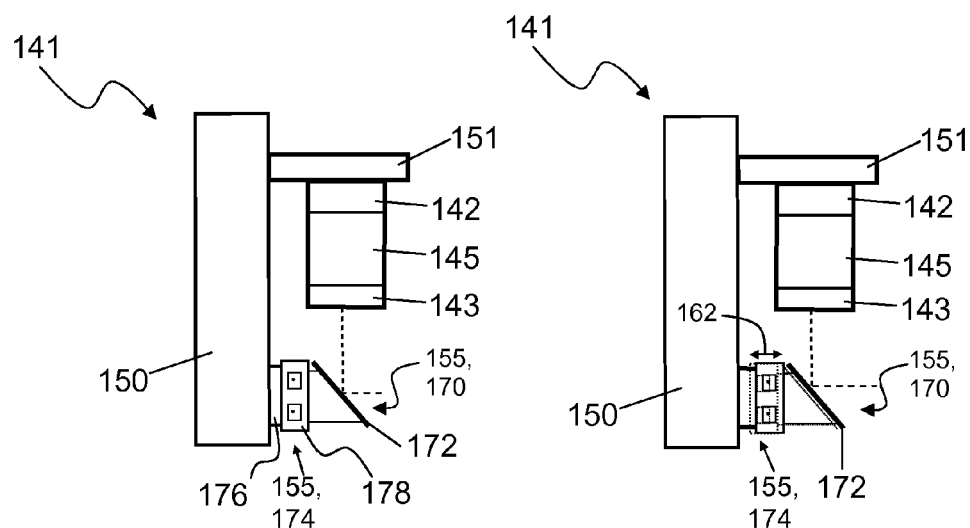
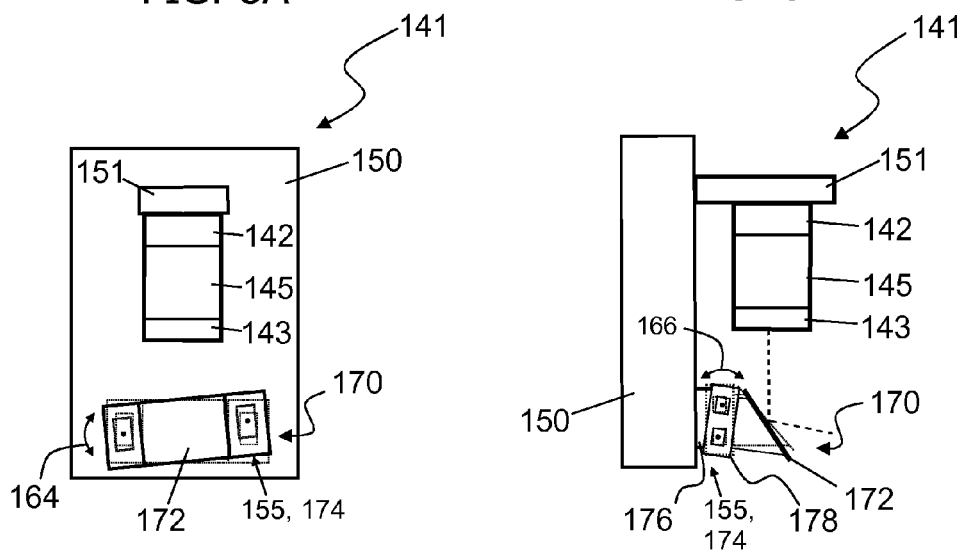

OPTICAL SCANNING PROBE

CROSS-REFERENCE TO RELATED APPLICATIONS

This application is a U.S. national stage entry under 35 U.S.C. §371 of PCT International Patent Application No. PCT/EP2013/056700, filed Mar. 28, 2013, which claims the benefit of U.S. Provisional Patent Application No. 61/618,319, filed Mar. 30, 2012, and U.S. Provisional Patent Application No. 61/692,109, filed Aug. 22, 2012, and priority to European Patent Application No. 12181396.8, filed Aug. 22, 2012, the contents of all of which are incorporated herein by reference in their entirety.

FIELD OF THE INVENTION

The present invention concerns an improved non-contact optical scanning probe.

BACKGROUND TO THE INVENTION

Scanning probes are non-contact optical probes for measuring thousands of points a second on the 3D surface shape of an object. There are three broad types of scanning probe: point, stripe and area. Most stripe scanning probes use the principal of optical triangulation.

In order to scan the surface of an object, a stripe scanning probe needs to move over the object's surface in a similar way to how a paintbrush is used for painting a surface. The movement of the stripe scanning probe may be accomplished manually or by automated equipment.

In order to obtain accurate data of the surface of an object, a localiser may be used to register the position and orientation of the stripe scanning probe when surface data is captured by the stripe scanning probe. Localisers are generally mechanical or remote. Localisers may also have the dual functionality of supporting/moving the probe as well as supplying its position and orientation. Mechanical localisers include: 3-axis Cartesian coordinate measurement machines (CMMs), Manual CMM arms, Robot CMM arms and essentially all types of combinations of continuous mechanical linkages that might accurately register the position and orientation of a probe end relative to a base end, the stripe scanning probe being rigidly attached to the probe end. Remote localisers include: optical trackers, optical CMMs, magnetic trackers and GPS systems. Remote localisers often require one or more lines of sight between the stripe scanning probe and the remote localiser equipment.

Manual CMM Arms have the flexibility of being able to access areas with difficult access. Manual CMM Arms are acceptably accurate for many applications, but are not automated; they are expensive to operate, particularly since a semi-skilled operator is required; human operators are also subject to human error. As examples, U.S. Pat. No. 3,994,798, U.S. Pat. No. 5,402,582, U.S. Pat. No. 5,829,148 and U.S. Pat. No. 6,366,831 disclose background information on Manual CMM Arms. Stripe scanning probes on Manual CMM Arms were disclosed by Crampton, in U.S. Pat. No. 6,611,617.

Stripe scanning probes are generally mounted offset on the side of the Manual CMM Arm or mounted on the probe end of it. Stripe scanning probes are usually quickly dismountable from a Manual CMM Arm using a mounting system that is mechanically repeatable to an acceptable degree of accuracy.

Robot CMM Arms and their use with stripe scanning probes were disclosed by Crampton, in U.S. Pat. No. 7,395,606 and U.S. Pat. No. 7,591,078. Robot CMM Arms have the advantage over Manual CMM Arms of supporting and moving the stripe scanning probe automatically. Both Manual CMM Arms and Robot CMM Arms have the advantage over Cartesian CMMs of articulation.

U.S. Pat. No. 6,141,105 discloses a three-dimensional measuring device, which uses a zoom unit with an autofocus function. US Patent Application 2009/0080036 discloses a scanner system, which uses a lens system for focusing an image onto the sensor element. US Patent Application 2007/0097381 discloses a three-dimensional metrology imaging system, which uses interchangeable lenses.

In the market, the user requirement of a scanning probe includes one or more of the following: Accuracy: Users demand ever higher accuracy and data quality from their stripe scanning probes; Mechanical stability: Users demand mechanically stable strip scanning probes; Long-term reliability: The optical systems within the scanning probe should not have to be recalibrated regularly; Speed: When surfaces are scanned, they are sampled. The quality and automation of the surface reconstruction or measurement is related to the number and density of raw points scanned. Scanning rates of current sensors on the market are typically 3 000 to 20 000 points per second. Rates exceeding 200 000 points per second will increase the productivity of the stripe scanning probes by reducing both data capture time and manual intervention in the post-processing activity; Compactness: It is desirable to provide a stripe scanning probe with built in processing and without an extra box of electronics and associated cables; Weight: It is desirable to provide a stripe scanning probe that weighs less; Cost: The market place is becoming more competitive and reductions the manufacturing cost of stripe scanning probes are therefore desirable.

SUMMARY OF SOME EMBODIMENTS OF THE INVENTION

The invention relates to a scanning probe (100) for the dimensional acquisition of an object (400) by irradiating the object (400) with light and detecting reflected light comprising:
- a detection unit (120) comprising an imaging sensor (122) and a sensor lens assembly (124) for detecting the reflected light,
- a light projecting unit (141) comprising a light source (142) for generating light, and source optics (145) for focusing the light, and light plane generating optics (143) for generating a light plane (149) for irradiating the object, and
- an adjustment mechanism (155) comprised in the light projecting unit (141), for adjusting the position or orientation of the light plane relative to the detection unit.

The numerical aperture of the sensor lens assembly (124) at the object side may be greater than 0.08. The sensor lens assembly (124) may comprise one or more lenses arranged in non-adjustable alignment with each other and with the imaging sensor (122). The detection unit (120) and the light projecting unit (141) may be attached to a rigid base plate (150), and the detection unit (120) may be rigidly attached to the rigid base plate (150). The central axis (126) of the sensor lens assembly and the light plane (149) projected by the light projecting unit (141) may form an acute angle, preferably between 15 and 45 deg. The sensor lens assembly (124) may comprise at least two lens elements, at least one of which is inclined with respect to the central axis of the optical system, and at least one of which is aligned with the central axis of the optical system. The source optics (145) and light plane generating optics (143) may be comprised within a source optics assembly (144), and a central axis (126) of the sensor lens assembly and a central axis (148) of the source optics assembly may not be parallel, and preferably bisect at an acute angle. The light source (142), source optics (145) and light plane generating optics (143) may be arranged as a subunit (140), wherein the position and/or orientation of the subunit (140) is adjustable and fixable relative to the detection unit (120) by the adjustment mechanism (155). The orientation of the subunit (140) relative to the detection unit (120) may be adjustable by a pivot of the subunit (140) relative to the detection unit (120), preferably around an axis perpendicular to the optical triangulation plane (147), which optical triangulation plane (147) is defined by the central axis of the (148) of the source optics assembly (144) and the central axis (126) of the sensor lens assembly (124). The light projection unit (141) may further comprises a light deflection unit, LDU, (170) for deflecting light, said LDU (170) configured to adjust and fix, the position and/or orientation of the light plane (149) relative to the detection unit (120). The LDU (170) may be disposed before the light plane generating optics (143), thereby deflecting the focused light, or after the light plane generating optics (143), thereby deflecting the light plane. The LDU (170) may comprise a light deflecting element, LDE, (172) for deflecting the light and an LDE adjustment mechanism (174) configured for adjustment of the position and/or orientation of the light deflecting element (172) relative to the base plate (150), preferably wherein the LDE adjustment mechanism (174) provides adjustment around one, two or three rotation axes and adjustment along one, two or three translation directions.

The invention further relates to a method for assembly of a scanning probe (100) comprising a detection unit (120) which comprises an imaging sensor (122) and a sensor lens assembly (124), a light projecting unit (141) which comprises a light source (142) for generating light, and source optics (145) for focusing the light, and light plane generating optics (143) for generating a light plane (149), comprising:
  adjusting, by an adjustment mechanism (155), the position and/or orientation of the light plane (149) relative to the detection unit (120) such that an imaging plane of the sensor lens assembly (124) coincides with the light plane (149), and
  fixing the position and orientation of the light plane (149).

The invention further relates to a method for assembly of a scanning probe (100) comprising a detection unit (120) which comprises an imaging sensor (122) and a sensor lens assembly (124) and comprising a subunit (140), comprising:
  adjusting, by an adjustment mechanism (155), the position and/or orientation of the subunit (140), comprising a light source (142), and a source optics assembly (144) generating a light plane (149) from light of the light source (142), relative to the detection unit (120) such that an imaging plane of the sensor lens assembly (124) coincides with the light plane (149), and
  fixing the position and/or orientation of the subunit (140).

The invention further relates to a method for assembly of a scanning probe (100) comprising
  a detection unit (120) which comprises an imaging sensor (122) and a sensor lens assembly (124), and
  a light projecting unit (141) which comprises:
    a light source (142) for generating light, source optics (145) for focusing the light, light plane generating optics (143) for generating a light plane (149) and
    a light deflection unit, LDU configured to adjust and fix, the position and/or orientation of the light plane (149) relative to the detection unit (120), comprising a light deflecting element, LDE, (172) for deflecting light and an LDE adjustment mechanism (174) configured for adjustment of the position and/or orientation of the LDE (172) relative to the base plate (150), thereby deflecting the light plane, comprising:
  adjusting the position and/or orientation of the LDE (172) such that an imaging plane of the sensor lens assembly coincides with the light plane, and
  fixing the position and/or orientation of the light deflecting element (172).

The adjusting may be performed using an adjustment rig that couples to a subunit (140) comprising at least the source optics (145).

BRIEF DESCRIPTION OF THE DRAWINGS

Embodiments of the present invention will now be described, by way of example only, with reference to the accompanying drawings, in which:

FIG. 8A is a schematic illustration of the light projection unit component of a scanning probe, where the adjustment mechanism of the light deflection unit is in a starting position.

FIG. 8B is a schematic illustration of the light projection unit component of a scanning probe, where the adjustment mechanism of the light deflection unit is shown to translate the light deflecting element.

FIG. 8C is a schematic illustration of the light projection unit component of a scanning probe, where the adjustment mechanism of the light deflection unit is shown to yaw the light deflecting element.

FIG. 8D is a schematic illustration of the light projection unit component of a scanning probe, where the adjustment mechanism of the light deflection unit is shown to tilt the light deflecting element.

DETAILED DESCRIPTION OF THE INVENTION

Figure 1:
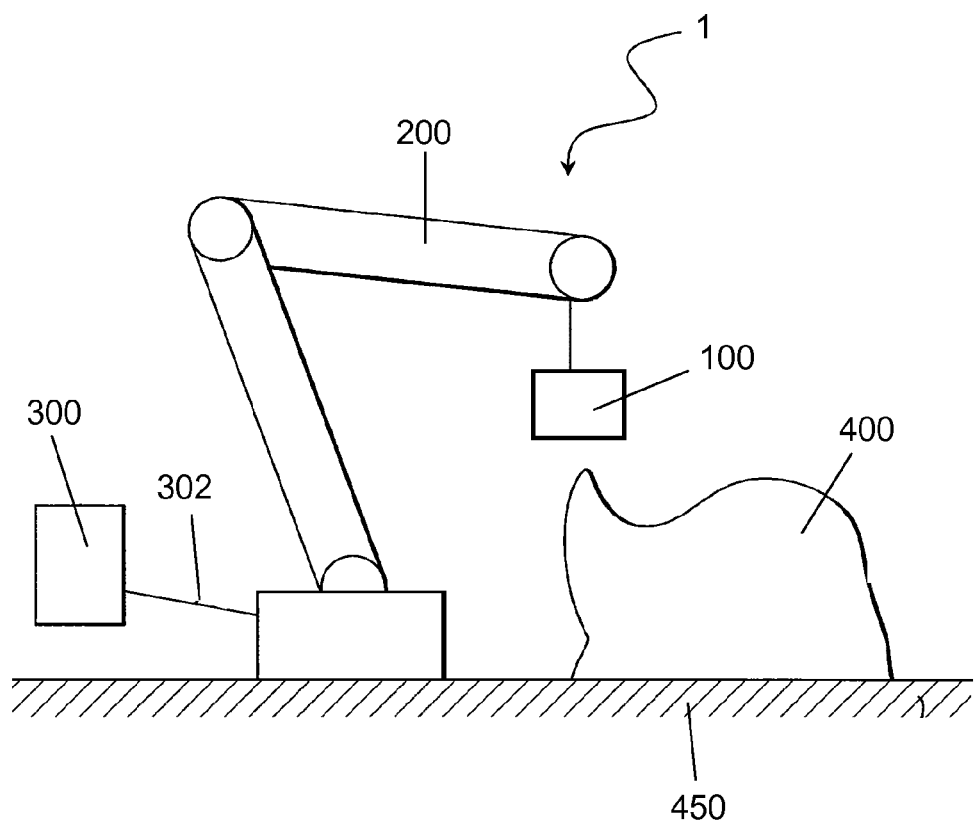
FIG. 1: is a schematic illustration of a system of the invention, comprising a scanning probe mounted on a localiser (a CMM arm) and the object to be dimensionally acquired by the scanning probe.

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

It is an aim of the invention to provide an improved scanning probe, particularly with improved performance and mechanical stability.

Improved performance and accuracy of optical scanning probes may be achieved by increasing the numerical aperture of the optical system for transmitting and focussing light reflected from the surface of an object onto an imaging device (e.g. CMOS or CCD) within the probe. Additional improvements in the scanning probe's accuracy and performance may be achieved by decreasing the angle of incidence of reflected light from the surface of an object onto the probe's imaging device.

To increase the accuracy and performance of the scanning probe's optical system while at the same time decreasing the angle of incidence of reflected light onto the probe's imaging device, larger and more complex compound lenses are required. However the additional size, complexity and weight associated with such optical systems introduces mechanical instability during the probe's use, leading to a degradation of performance and accuracy. The present invention aims to overcome the problems in the art to provide a scanning probe that has at least improved stability.

The present invention concerns a scanning probe, suitable for dimensional acquisition of an object. As used herein, the term "dimensional acquisition" also refers to dimensional probing, measuring or profile measuring. It is preferably a digital stripe scanning probe. The probe is "digital" in the sense that the probe comprises a processing feature, for example, to compute the compute the intensity from one frame to another (e.g. using a DSP processor or a FPGA processor or microcontroller) and/or to convert data recorded by the sensor into digital data. The scanning probe is typically part of a scanning system.

FIG. 1 shows an example of a layout of a scanning system 1 comprising a scanning probe 100. The scanning system 1 comprises a scanning probe 100 mounted on a localiser 200. The localiser 200 communicates with a computer 300 by means of a cable 302 or by wireless communication. The localiser 200 and an object 400 are mounted on a solid surface 450 such that there is no relative movement during scanning. It will be understood by the person skilled in the art that this is an example of one such scanning system 1 that can be built using a scanning probe 100, but that other types of scanning system with a stripe scanning probe may be employed instead.

Figure 2:
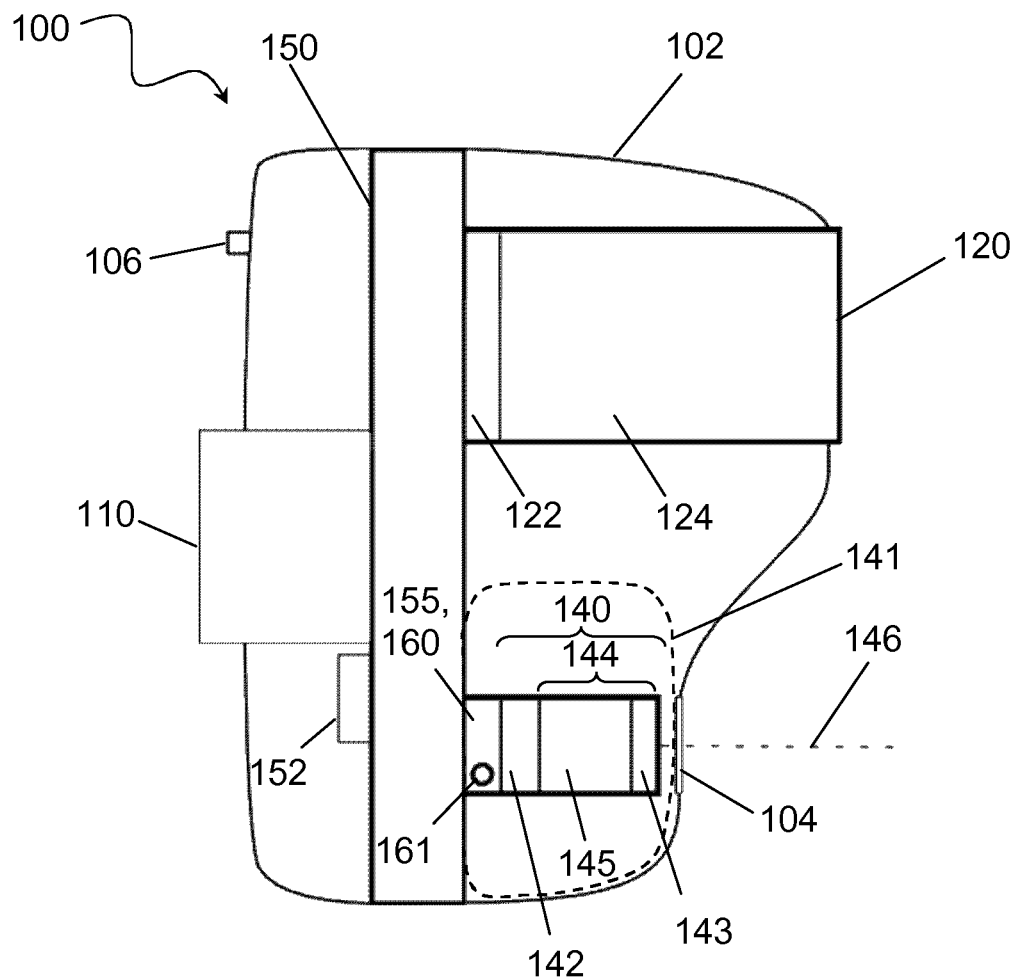
FIG. 2: is a schematic illustration of a scanning probe disposed in a housing whereby the adjustment mechanism tilts and rotates the LDU subunit.

FIG. 2 is a schematic cross-sectional view of an example of a scanning probe 100 according to the invention, wherein the object 400 would be placed to the right of the scanning probe 100. The scanning probe 100 is preferably a stripe scanning probe. The scanning probe 100 is preferably a digital stripe scanning probe. The scanning probe 100 comprises a detection unit 120 comprising an imaging sensor 122 and sensor lens assembly 124. It further comprises a light projecting unit 141 comprising a light source 142 and source optics assembly 144. More specifically, the light projecting unit 141 comprises a light source 142 for generating light, source optics 145 for focusing the light, and light plane generating optics 143 for generating a light plane (also known as a stripe). In the case of a laser scanning probe, the light projecting unit 141 would comprise a laser source 142 and a source optics assembly 144. The detection unit is rigidly attached to a rigid base plate (chassis) 150.

The light projecting unit 141 further comprises an adjustment mechanism 155 configured to adjust and fix the position and/or orientation of the light plane 149 (FIG. 3) relative to the detection unit prior to subsequent use. Preferably, the position and/or orientation of the light plane 149 (FIG. 3) relative to the detection unit is only adjusted and fixed prior to first-time use, typically remaining unadjusted for the lifespan of the scanning probe. In FIG. 2 the adjustment mechanism 155, 160 is attached to the light source 142 to tilt and/or rotate light source 142. The light source 142 is moveably attached to the base plate 150. The adjustment mechanism 155, 160 allows for movement of light source 142 relative to the base plate 150 and hence detection unit 120. The adjustment mechanism 155 is configured to fix the position and orientation of the light source 142 for subsequent use, typically for the lifespan of the scanning probe.

Figure 3:
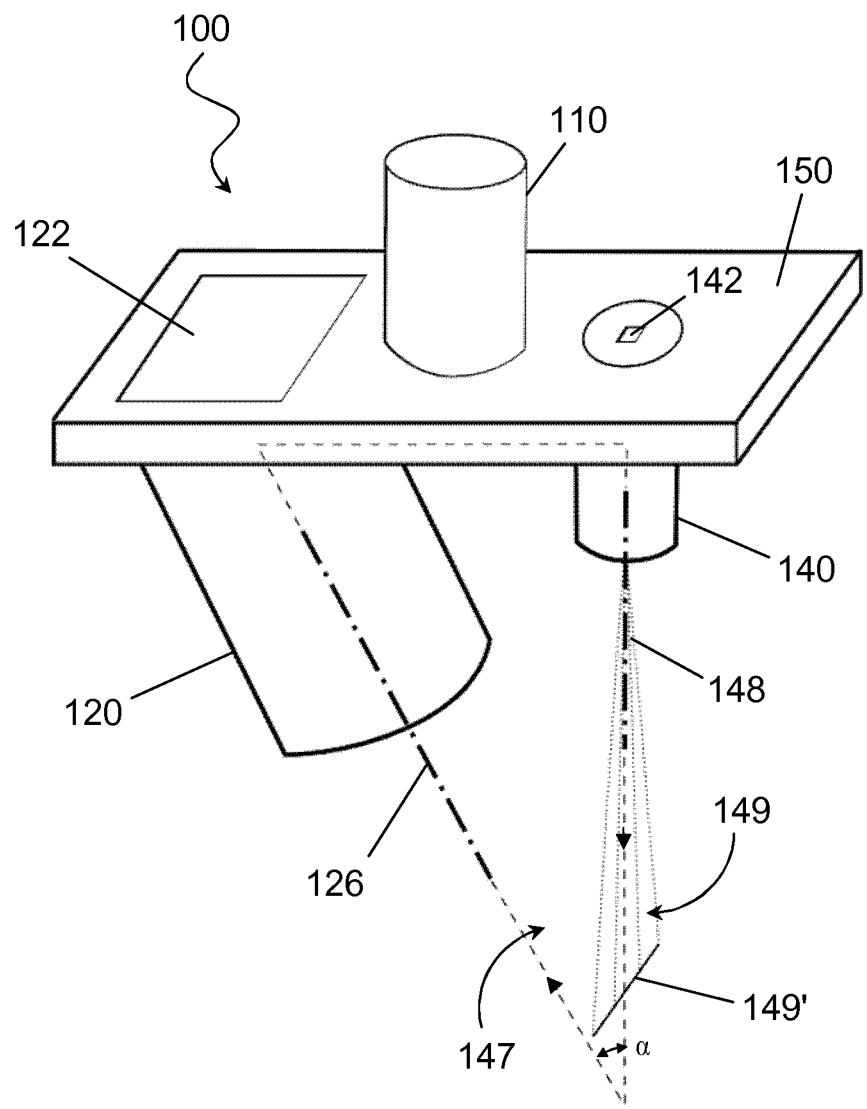
FIG. 3: is a schematic illustration of a scanning probe. The optical triangulation plane is indicated, which is the plane formed by the central (optical) axis of the source optics assembly and the central (optical) axis of the sensor lens assembly (both axes are shown). The light plane and the projected light path are indicated.

The adjustment mechanism 155 comprises different embodiments, depending on whether the light source 142 itself and/or the source optics assembly 144 is mechanically adapted to fix the position and orientation of the light (adjustment mechanism 160) or whether the light is deflected by a light deflecting unit 170, said light deflecting unit 170 being mechanically adapted to fix the position and orientation of the light. The adjustment mechanism 155 is thus not limited to one that tilts and/or rotates the light source 142. The adjustment mechanism 155 may be any, including, for instance, one 174 incorporated into a light deflecting unit 170 (e.g. containing an adjustable light deflecting element 172 such as a mirror and an adjustment mechanism 174) as shown in FIGS. 6, 7, and 8A to 8D to change, by deflection, the angle and/or orientation of the light plane 149. (FIG. 3).

The fixed position remains and subsequent use is typically for the lifetime of the scanning probe 100. A one-time adjustment of the position and/or orientation of the LPU subunit 140 or of a light-defecting element 172 relative to the base plate 150, and hence relative to the detection unit 120, provides long term stability once fixed, and obviates the need for an adjustable sensor lens assembly 124 which can be impractical for meeting cost and performance criteria. The skilled person will appreciate that the adjustment mechanism described herein does not actively adjust the position and/or orientation of the light plane 149 during acquisition, for example, in response to information received from the detection unit. In other words, the adjustment mechanism is a non-active mechanism. The adjustment is performed prior to the subsequent service life of the scanning probe 100. The base plate 150 is made from a rigid substance, such as aluminium. It preferably has an essentially planar form.

Typically the scanning probe 100 comprises an enclosure 102. The enclosure 102 is mounted on the rigid base plate 150. One or more windows 104 may be provided in the enclosure 102 for the lightpath 146 of the projected stripe or light plane to exit the enclosure 102. One or more windows may be provided in the enclosure 102 for viewing the stripe on an object (not shown). A processing unit 152 is mounted inside the imaging enclosure 102.

A mounting plate 110 is provided on the base plate 150, typically rigidly attached thereto, for mounting the scanning probe 100 onto a localiser 200. A connector 106 is provided for connecting a cable to the digital stripe scanning probe 100; alternatively electrical connection could be automatically made at connector 106 when the digital stripe scanning probe 100 is mounted via mounting plate 110 onto a localiser 200.

Another view of a scanning probe 100 according to the invention is provided in FIG. 3. It shows the detection unit 120 set at an angle to the base plate 150, and the LPU subunit 140 essentially perpendicular to the base unit 150. The scanning probe 100 projects a triangular plane of light known as a light plane 149, that illuminates the object as a line 149' of light. The optical (central) axis 126 of the sensor lens assembly is indicated. The optical (central) axis 148 of the source optics assembly 144 is also indicated. According to one aspect, the optical (central) axis 126 of the sensor lens assembly and the optical (central) axis 148 of the source optics assembly 144 bisect. When they bisect, they preferably bisect at an acute angle, alpha.

A triangle is formed by the optical (central) axis 126 of the sensor lens assembly and by the light plane 149 that is the optical triangulation plane 147. More specifically, the triangle is formed by the optical (central) axis 126 of the sensor lens assembly on one side, by the projected light plane or laser line that bisects the optical (central) axis 126 on another side, and by the line between imaging sensor 122 and the light source 142 on a further side. The triangle forms angle alpha opposite the sensor lens assembly and the LPU subunit 140. Preferably alpha is an acute angle. Preferably alpha is equal to or less than 15 deg, 20 deg, 25 deg, 30 deg, 35 deg, 40 deg, 45 deg, 50 deg, or 55 deg, or a value in the range between any two values, preferably between 15 and 45 deg.

The detection unit 120 comprises an imaging sensor 122 and a sensor lens assembly 124. The sensor lens assembly 124 projects the light reflected from the object onto the imaging sensor 122.

The imaging sensor 122 may comprise a one-dimensional (1D) or two-dimensional (2D) array of light-sensitive pixels. The former is suited for a linear scan imager and the latter for an area scan imager. The imaging sensor 122 may be a CMOS or CCD sensor, both having a two-dimensional (2D) array of light-sensitive pixels. The imaging sensor 122 is rigidly attached to the base plate 150. The position of the imaging sensor 122 is not adjustable with respect to the base plate. For example, during assembly of the scanning probe 100, the imagine sensor 122 is attached to the base plate 150 using fixation screws rather than adjustment screws, or by using adhesive.

The sensor lens assembly 124 projects (and focuses) the image of the laser line, which is deformed by the shape of the surface of the measurement object 400, onto the imaging sensor 122. The sensor lens assembly 124 comprises a combination of a number of optical elements in stacked arrangement to achieve the desired optical characteristics. Examples of optical elements include refractive lens, mirror, prism and the like. They may be formed of glass, or polymeric substance. The optical characteristics of the sensor lens assembly 124 (e.g. one or more of focal distance, numerical aperture, depth of field, etc.) are determining factors for the final performance of the optical probe.

The sensor lens assembly 124 comprises one or more lenses, preferably arranged in fixed, non-adjustable alignment with each other and preferably arranged in fixed, non-adjustable alignment with the imaging sensor 122. This may be achieved by stacking the lenses in a cylindrical housing made, for instance, from aluminium, using one or more rings to separate the lenses and to hold them rigidly in position with respect to the cylindrical housing.

Essentially, the sensor lens assembly 124 is rigidly attached to the base plate 150, preferably without any adjustment features. This is preferably achieved, during assembly of the scanning probe 100, by attaching the sensor lens assembly 124 to the base plate 150 using fixation screws rather than adjustment screws, and/or by using adhesive. According to one aspect of the invention, the sensor lens assembly 124 is attached to the base plate 150 without adjustment screws.

By rigidly attaching the sensor lens assembly 124 to the base plate 150 the weight of the overall scanning probe 100 can be reduced. Adjustment features to the sensor lens assembly 124 would require additional materials and structure to support a high-performance, heavy lens. The adjustment feature is a source of mechanical instability which may become evident when the scanning probe 100 is transported, or even during normal use due to the effects of gravity. This mechanical instability would cause measurement errors, and may require repair and subsequent realignment. Moreover, an adjustment feature designed to support a large lens would increase the weight of the scanning probe 100. The weight of the scanning probe 100 is critical when used in conjunction with, for instance, a localiser which will have a maximum loading, or when the probe is manually supported. An adjustable, high-performance lens would not be feasible owing to its weight. The present invention allows a scanning probe to be disposed with larger, high-performance lenses without the accompanying gain in weight due to an adjustment feature, since the sensor lens assembly 124 has fixed components, no adjustment feature and is fixed directly to the base plate 150. Adjustments are instead transferred to the laser unit, which is lighter, requiring a light adjustment mechanism (see later below) that does not significantly contribute to the weight of the scanning probe 100.

The rigid and fixed attachment of the sensor lens assembly 124 to the base plate 150 also rigidly fixes position of the sensor lens assembly 124 relative to the LPU subunit 140 once the position and orientation of the LPU subunit 140 has been factory set.

Further, the sensor lens assembly 124 is in fixed, non-adjustable alignment with the imaging sensor 122. Thus, effectively, the detection unit 120 is in rigid and fixed attachment to the base plate 150 which also rigidly fixes the position of the detection unit 120 to the LPU subunit 140 once the position and orientation of the LPU subunit 140 has been factory set.

The rigid and fixed attachment of the imaging sensor 122, the sensor lens assembly 124 and the detection unit 120 to the base plate 150 thus provides optimal long term mechanical stability.

For optimal optical performance, the object focal plane of the sensor lens assembly 124 coincides with the laser plane projected by the LPU subunit 140. Due to the triangulation concept, the laser plane and the optical axis of the sensor lens assembly 124 make a small relative angle (alpha in FIG. 3), that is typically 15 to 45 degrees. As a consequence, the image from the laser line will be projected in an image focal plane that is not perpendicular to the optical axis. In order to obtain focused images and best probe performance, the imaging sensor 122 must be arranged to coincide with the focal plane of the sensor lens assembly 124. This is also known as the Scheimpflug principle.

Due to the optical configuration and the increased numerical aperture, the imager angle (Scheimpflug angle) will also increase (between 20 and 30 degrees). This results in additional optical defects, which have a degradation effect on the probe performance.

A sensor lens assembly 124 is therefore configured to reduce the angle of the focal plane (imager side) with respect to the optical axis, while keeping the high performance sharp imaging over most or all of imaging sensor area.

The sensor lens assembly 124 preferably provides a Scheimpflug angle equal to or less than 45 deg, preferably 40 deg, 35 deg, 30 deg, 25 deg, or 20 deg; this may be achieved using a prism before the imaging sensor, and/or by shifting one or more lens elements relative to the imaging sensor plane, and/or by rotating and shifting one or more lens elements relative to the imaging sensor plane.

The sensor lens assembly 124 preferably has a high numerical aperture (NA). Preferably the NA is maximised permitted, which will depend on factors such as maximum weight and size requirement of the scanning probe 100. The numerical aperture, preferably at the object side, may be equal to or greater than 0.08, 0.10, 0.12, 0.13, 0.14, 0.15, 0.16, 0.17, 0.18, 0.19, or a value in the range between any two of the aforementioned values, preferably around 0.17. This implies a lens entrance diameter equal to or greater than 12 mm, 16 mm, 20 mm, 22 mm, 24 mm, 26 mm, 28 mm or 30 mm or a value in the range between any two of the aforementioned values, preferably around 24 mm. Such larger lens leads to a reduction in speckle.

The sensor lens assembly 124 may be provided with one or more interference filter coatings applied to the front surface of the lens to minimise the number of optical components.

According to one aspect of the invention, the sensor lens assembly 124 comprises at least two lens elements (e.g. 2, 3, 4, 5, 6, 7, 8 or more lens elements), at least one of which is inclined with respect to the axis of symmetry 126 (central axis) of the optical system, and at least one of which is aligned with (or perpendicular to) the axis of symmetry 126 (central axis) of the optical system. According to one aspect of the invention, at least one of the lens elements is a refractive lens. According to one aspect of the invention, at least one of the lens elements is a prism. According to one aspect of the invention, at least one of the lens elements is shifted.

The light projecting unit, LPU, 141 comprises a light source 142 for generating light, a source optics 145 for focusing the light, and a light plane generating optics 143 for generating a light plane 149. It also comprises an adjustment mechanism 155 (160 or 170) for adjusting the position and/or orientation of the light plane 149.

The LPU 141 comprises a light source 142 for generating a beam of light or a light plane to irradiate the object surface. The light source 142 may be a laser source, a laser diode, a superluminescent diode, a light emitting diode (LED), or a white light source, or combinations thereof. Preferably the light source 142 is a laser source. More preferably, the light source 142 is a laser diode. The light source 142 may emit light in any part of the electromagnetic spectrum such as the visible, infrared, etc. It preferably emits light at 660 nm.

The LPU 141 also comprises source optics 145 for projecting light generated by the light source 142 onto the object 400. More specifically, the source optics 145 focus the light. The source optics 145 may comprise collimating optics, a collimating lens, collimating optics assembly, a collimating lens assembly, diffractive optics, reflective optics, or a prism, or a combination of one or more of these. The source optics 145 are preferably located adjacent to the light source 142.

The LPU 141 also comprises light-plane generating optics 143 for generating a light plane 149 or more specifically a stripe 149' on the surface of the object. The light plane generating optics 143 may comprise stripe-generating optics, a cylindrical lens, a rotating or oscillating mirror, a Powell lens, or diffractive optics, or a combination of one or more of these. Where it comprises a rotating or oscillating mirror, said mirror sweeps a light point which generates a plane.

The light plane 149 (see FIG. 3) is generally triangular. It is within the scope of the invention that the LPU 141 projects a single light plane 149 or multiple light planes (e.g. 2, 3, 4 or more) which may be crossing or parallel or both. This results in one stripe, or multiple stripes (e.g. 2, 3, 4 or more) which may be crossing or parallel or both on the surface of the object. The multiple light planes (e.g. 2, 3, 4 or more) may be achieved using multiple light sources 142 or using light-plane generating optics 143 configured to generate multiple light planes from a single light source 142. Preferably, the scanning probe 100 is disposed with a light source 142 that projects a single light plane 149 or more specifically a stripe 149' and with one detector unit 120.

Typically the light-plane generating optics 143 are disposed adjacent to the source optics 145. Typically the light-plane generating optics 143 are disposed after the source optics 145 i.e. are further from the light source 142.

The source optics 145 and light-plane generating optics 143 may be combined to form a source optics assembly 144. When the light source is a laser source and the source optics are collimating optics, the source optics assembly is a laser lens assembly.

According to one aspect, the light source 142, the source optics 145, and optionally the light plane generating optics 143 may be assembled into an entity known herein as an LPU subunit 140 (or laser unit 140 when the light source, source optics, and plane generating unit are particular to a laser source). LPU subunit 140 comprises the light source 142, the source optics 145 and optionally the light plane generating optics 143. In an embodiment, the source optics 145 and the light plane generating optics 143 comprise a common optical element or common optical elements. According to one aspect of the invention, the light source 142, the source optics 145 and the optional light plane generating optics 143 are held in fixed positional relation with each other in LPU subunit 140. The LPU subunit 140 preferably comprises the light plane generating optics 143 when the light deflection unit, LDU 170 (see later below) is absent, or when the light deflection unit, LDU 170 (see later below) is present and the LDU 170 is situated after the light plane generating optics 143.

Preferably the light source 142 is a laser source, more preferably a laser diode. Preferably the laser source is combined with a collimating lens or a collimating lens assembly to focus the light. Preferably, the laser source and collimating lens or a collimating lens assembly are combined with a cylindrical lens to generate the plane of light 149. In a preferred embodiment, LPU subunit 140 projects light from the laser source 142 in a collimated, flat beam. Typically, the laser optics assembly 144 comprises collimating optics 145 and stripe or line generating optics 143 (e.g. cylindrical lens, Powell lens, DOE, etc.); this is a solid state LPU subunit 140 without any moving parts. Typically the stripe generating optics 143 are disposed after the collimating optics 145 i.e. are further from the laser source 142. The collimating optics (collimator) typically are a combination of a number of lens elements which are designed for optimal optical performance. The stripe generating optics 143 may be replaced with a rotating or oscillating mirror to sweep a collimated laser point which generates a laser line.

According to one aspect, the position and/or orientation of the LPU subunit 140 relative to the detection unit 120 may be adjustable and fixable prior to the subsequent use-in-service of the scanning probe 100. The LPU subunit 140 is thus moveably attached to the base plate 150 during its assembly, preferably by the light source 142. An adjustment mechanism 155, 160 allows movement of the LPU subunit 140, during assembly, relative to the base plate 150 (and hence relative to the detection unit 120). The adjustment mechanism 155, 160 is configured to adjust or allow adjustment, and then to fix the position and orientation of the LPU subunit 140 for subsequent use.

According to one aspect, adjustment mechanism 160 is configured to adjust or allow adjustment, and then to fix the position and orientation of the laser unit 140 for subsequent use. The fixed position remains and subsequent use are typically for the lifetime of the laser scanner 100. A one-time adjustment of the position and/or orientation of the laser unit 140 relative to the base plate 150, and hence relative to the detection unit 120, provides long term stability once fixed, and obviates the need for an adjustable sensor lens assembly 124 which can be impractical for meeting cost and performance criteria. The skilled person will appreciate that the adjustment mechanism described herein does not actively adjust the laser unit during acquisition, for example, in response to information received from the detection unit. In other words, the adjustment mechanism is a non-active mechanism. The adjustment is performed prior to the subsequent service life of the scanner probe 100.

It is also appreciated that the adjustment mechanism may comprise plurality of separate adjustment elements, each allowing for the adjustment of a different aspect of the position and/or orientation of the LPU subunit 140. For instance, one adjustment element may allow translation of the LPU subunit 140 relative to the base plate 150 and hence detection unit 120. For instance, one adjustment element may allow rotation of the LPU subunit 140 relative to the base plate 150 and hence detection unit 120.

One adjustment element may allow rotation along the central (optical) axis 148 of the source optics and/or the light plane generating optics 143 relative to the light source 142. In particular, it may allow the light plane generating optics 143 to rotate relative to light source 142. Thus, the source optics assembly, such as a laser lens assembly 144, may be configured so that the angle of the plane projected by the LPU subunit 140 can be adjusted. This adjustment is also one that is fixed prior to the subsequent use.

The adjustment mechanism 160 holds the LPU subunit 140 and optionally light plane generating optics 143 in a fixed position and orientation relative to the detection unit 120 prior to subsequent use. The position and orientation are typically held during the normal lifespan of the scanning probe 100, for example by tightening fixing screws or by using adhesive. A normal lifespan refers to the lifetime of the scanning probe 100. The lifetime is the typical operation period without irreparable failure, for example, between 5 and 50 years, depending on several factors including the quality of the components employed, the environment in which it is used, and the frequency of use. The lifetime can be extended by servicing and by any necessary repairs. Prior to use, and during assembly of the optical scanning probe, the adjustment mechanism is utilised to change the position and orientation relative to the detection unit 120 in order to achieve the desired accuracy performance. After the adjustment has been made, the position and orientation is fixed for long term mechanical stability and invariance during mechanical or thermal excitation (e.g. during transport and normal use).

The adjustment preferably involves one of more of the following movements:

i) pivoting 166 (FIG. 5) of the LPU subunit 140 about one or more (e.g. 1, 2) axes, relative to the base plate 150 and hence detection unit 120, ii) translation 162 (FIG. 4) of the LPU subunit 140 relative to the base plate 150 and hence detection unit 120, iii) rotation of the LPU subunit 140 about the central (optical) axis 148 of the LPU subunit 140, iv) rotation 164 (FIG. 4) of the stripe generating optics 143 along the central (optical) axis 148 of the source optics assembly 144 relative to light source 142.

Adjustments i), ii) and iv) are preferred. The adjustments may be performed individually or simultaneously.

The movements (i-iv) may also be combined. For example, the adjustment mechanism 160 in FIG. 4 and FIG. 5 allows for pivoting 166 and translation 162 to occur simultaneously. This may be achieved by allowing two or more screws to be positioned within two or more corresponding windows, whereby the dimensions of the windows and respective position of the screws define the extent of allowed pivoting 166 and/or translation 162. In an embodiment, the screws can be tightened, thereby fixing the position of the screws with respect to the windows.

Figure 5:
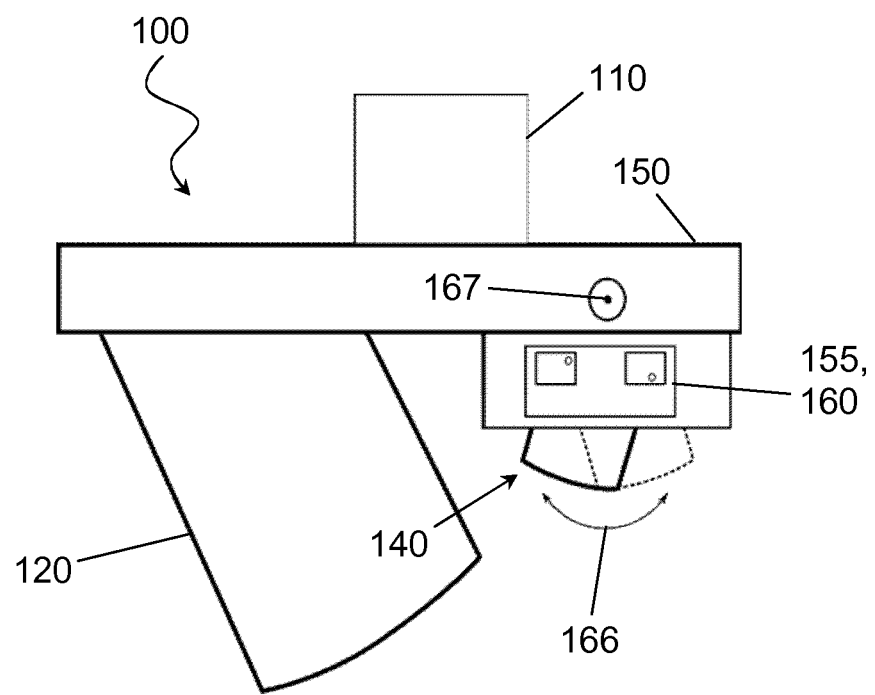
FIG. 5: is a schematic illustration of a scanning probe as viewed perpendicular to the optical triangulation plane. Rotation of the LDU subunit around the axis perpendicular to the optical triangulation plane is shown.

Preferably, pivoting 166 of the LPU subunit 140 relative to the base plate 150 (i above) is about an axis perpendicular to the optical triangulation plane 147. A point 167 along the pivoting axis is indicated in FIG. 5.

Preferably, translation 162 of the LPU subunit 140 relative to the base plate 150 (ii above) is in a direction that adjusts the distance between the LPU subunit 140 and the detection unit 120. It may be along an axis perpendicular to the laser plane 149.

Preferably, rotation of the LPU subunit 140 relative to the base plate 150 (iii above) is about the central (optical) axis 148 of the source optics assembly 144. Preferably rotation of the light plane generating optics 143 is about the central (optical) axis 148 of the source optics assembly 144 (iv above).

It will be appreciated that other adjustments to the LPU subunit 140 may be made to optimise the scanning probe 100. For instance, the focus of the collimator lens (e.g. collimator lens when the light source is a laser source) may be adjusted and then fixed. Specifically, the distance between the light source 142 (e.g. laser source) and the source optics 145 (e.g. collimating optics) may be adjusted and then fixed, for example by tightening fixing screws or by using adhesive. Alternatively, or in addition, the light source 142 (e.g. laser source) may be displaceable relative to the source optics 145 (e.g. collimating optics); specifically, the light source 142 may be in sliding relation to the source optics 145 perpendicular to the optical axis of the source optics 145. Again, this adjustment may be made, and then fixed.

In order to achieve a fine tuning of these geometrical parameters, an external adjustment rig may be used. For the adjustment, both the base plate 150 and the LPU subunit 140 may be mechanically connected to the adjustment rig. The rig may comprise a jig. The light source 142 (e.g. laser source) and the image sensor 122 are connected to an electronics board, so their function can be activated. Based on optical measurements, the translation and rotations are adjusted until the required performance is achieved. The adjustment preferably aligns the sensor lens assembly focal plane (object side) with the laser plane. In particular, the tuning of the focus, position, orientation, flatness and intensity profile may be performed manually by untightening the fixing screws, manipulation of the adjustment elements and tightening the screws again. This may be a single adjustment or an iterative process.

The manipulation of the adjustment elements may be assisted by an adjustment tool configured to operatively couple with the adjustment element. According to one embodiment of the invention, the LPU subunit 140 or adjustment mechanism 160 comprises one or more couplings 161 for receiving an adjustment tool to assist with performing the adjustment. The coupling may take the form of a screw thread (male or female), a notch, a hole, a protrusion, rod or hook, for instance. The coupling may be configured for access outside the probe enclosure (e.g. it may have a rod shape). Particularly, the adjustment tool may comprise an elongate member, one end of which (effector end) is configured for attachment to the coupling on the LPU subunit 140 or adjustment mechanism 160, the other end of which (user end) receives force for transmission to the effector end. The elongate member acts as a lever to transmit large movements from the user end to the effector end where the movements are reduced in scale. The user end may be operatively attached to an arrangement of thumb screws on a supporting rig, the rotation of which adjust the position of the lever, allowing a very fine control of movements by the effector end and hence by the LPU subunit 140 or adjustment mechanism 160. The rig may comprise a plurality of such thumbscrews, arranged in different directions, depending on the movements required. As such, the position and orientation of the LPU subunit 140 can be set.

Once the adjustments are done and confirmed by software tools, the geometrical position of the LPU subunit 140 or the laser lens assembly 144 is locked using screws and/or adhesive. The adjustment is based on a number of optical characteristics which are tuned. Once the tuning is performed, the scanning probe is to be calibrated. The calibration preferably takes into account the remaining imperfections of the adjustment, as well as other non-adjustable imperfections for compensation by software. During the calibration the remaining imperfections of the optical configuration are identified using a more accurate reference instrument. The measured imperfections are translated into compensation values to improve the system performance during subsequent use.

The adjustment mechanism may be any, for instance, it may comprise a threaded rod to translate the LPU subunit 140 and a threaded nut to lock the final position, or it may comprise a slotted guide to allow translation or pivoting of the LPU subunit 140 and a screw that engages the slot to lock the final position, or it may comprise a (pivoted or revolute) joint to facilitate a movement that can be locked in position using an adhesive. Examples of suitable adhesives include bonding adhesives such as cyanoacrylates, epoxies and hot melts. The position of a bolt, nut or screw may be fixed for the lifetime of the scanning probe 100 using a thread-locking adhesive.

Due to the type of integration of the scanning probe 100 into a measurement system, there may be restrictions to the maximal weight and size of the scanning probe 100, hence of the mechanical structure. A lightweight mechanical structure is preferred, which entails a simple system. The skilled person would understand that the adjustment mechanism combines fine adjustment, long term stability once fixed and low weight restrictions.

Figure 4:
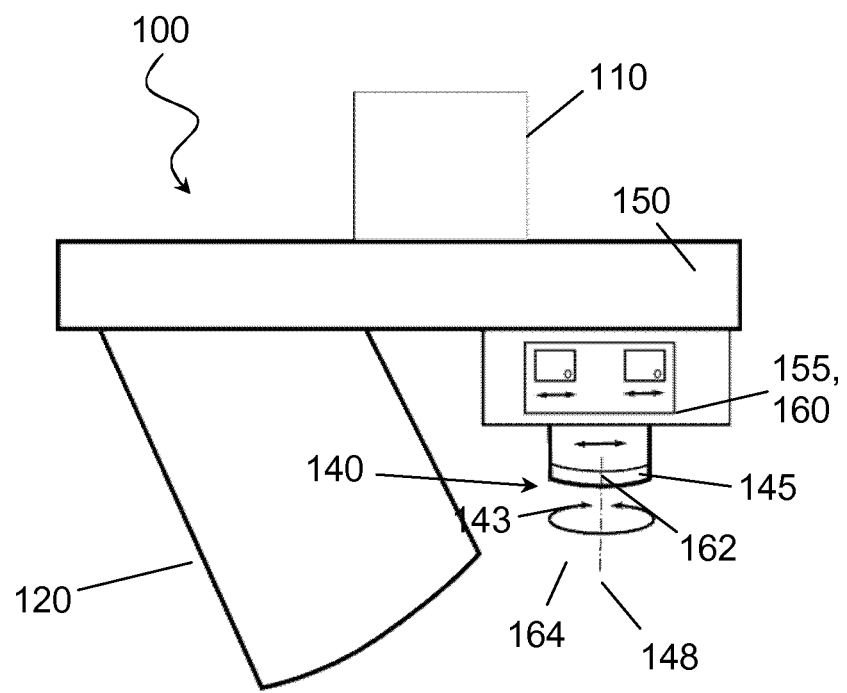
FIG. 4: is a schematic illustration of a scanning probe as viewed perpendicular to the optical triangulation plane. Translation and rotation of the LDU subunit around axis of the source optics assembly are shown.

FIGS. 4 and 5, depict the main features of a scanning probe 100, namely, the detection unit 120, the LPU subunit 140 and mounting plate 110 attached to a base plate 150. The LPU subunit 140 is attached to the base plate 150 using an adjustment mechanism 155, 160.

FIG. 4 indicates translational adjustments 162 to the LPU subunit 140. This may be achieved using a first support attached to the base plate 150, which contains an aperture (e.g. square or round opening, slot, linear slot) for receiving a bolt, and a second support attached to the LPU subunit 140 which contains a hole for receiving the same bolt. The first and second supports form part of an adjust mechanism. The shaft of the bolt passes through both aperture and hole, but not the head or receiving nut. The first support can slide relative to the second support, its movements restricted by the slot to a translation. Once in position, the bolt may be tightened against the nut, adhesive applied to the thread, and LPU subunit 140 locked into position relative to the base plate 150. It is noted that the FIG. 4 employs a square aperture rather than a slot, so allowing translation of the first support relative to the second support in two-dimensions.

FIG. 4 also indicates rotational adjustments 164 to the LPU subunit 140, which are along the optical (central) axis 148 of the source optics assembly 144, for instance, of the laser lens assembly. Such a rotational adjustment may be achieved by employing a revolute joint between the housing of the light-plane generating optics 143 and the source optics 145 in the source optics assembly 144. The light-plane generating optics 143 can then rotate relative to the light source 142. Once in optimal position, the light-plane generating optics 143 may be locked into position relative to the light source 142 using, for instance, an adhesive substance.

FIG. 5 indicates another rotational adjustment 166 to the LPU subunit 140, which is a pivoting movement relative to the base plate 150. This may be achieved by mounting the LPU subunit 140 relative to the base plate using the first and second supports described above, whereby the first support is disposed with a square aperture. Alternatively, this may be achieved by mounting the LPU subunit 140 relative to the base plate using a pivoted support such as a gimbal which provides rotation about a single axis. Where pivoting along two axes in required, a universal joint may be employed. The LPU subunit 140 can be pivoted relative to the base plate 150. Once in position, the LPU subunit 140 may be locked into position relative to the base plate 150 using, for instance, an adhesive substance.

Figure 6:
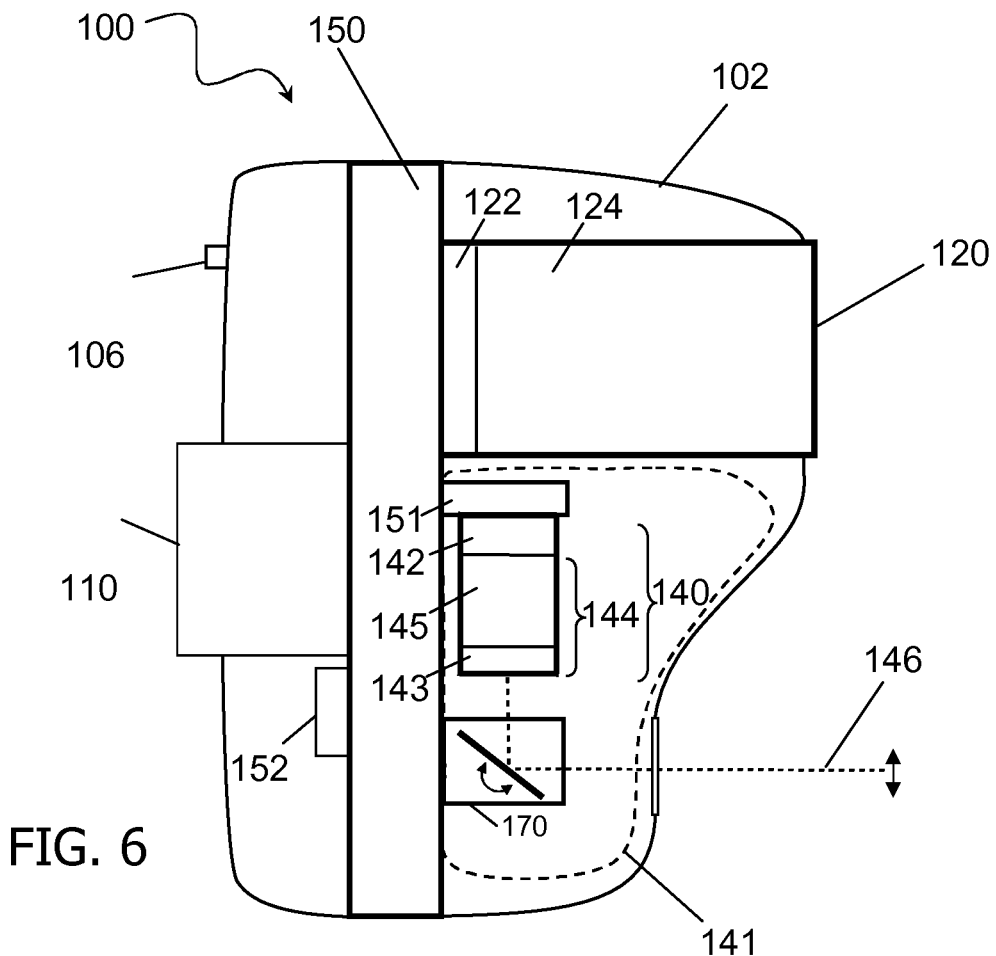
FIG. 6: is a schematic illustration of a scanning probe disposed in a housing whereby the adjustment mechanism is comprised in a light deflection unit, that tilts and rotates a light deflection element, and the light plane generating unit is disposed between the source optics and the light deflection unit.
Figure 7:
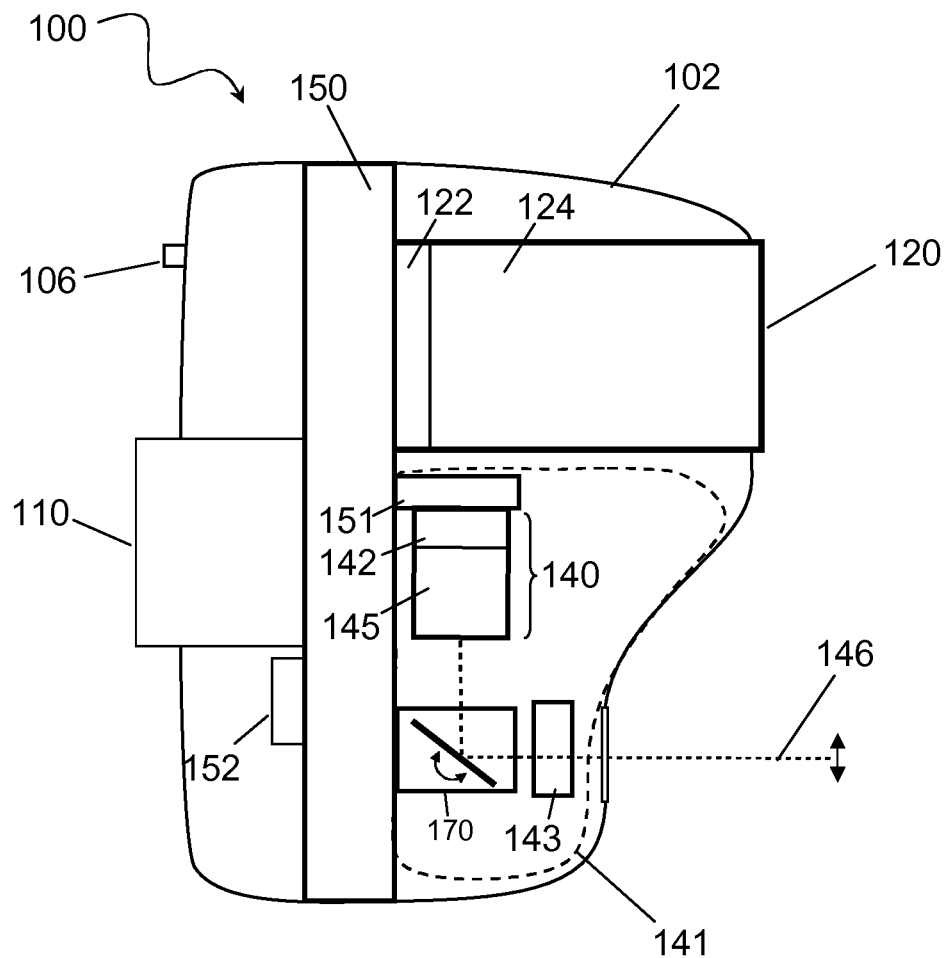
FIG. 7: is a schematic illustration of a scanning probe disposed in a housing whereby the adjustment mechanism is comprised in a light deflection unit, that tilts and rotates a light deflection element and the light plane generating unit is disposed after the light deflection unit.

As mentioned earlier, the adjustment mechanism 155 may comprise a light deflection unit, LDU 170 (e.g. an adjustable mirror) as shown in FIGS. 6 and 7 to change, by deflection, the angle and/or orientation of the light plane 149. An LDU 170 preferably comprises a light deflection element, LDE, 172 configured for deflecting light and an adjustment mechanism 155 that is an LDE adjustment mechanism 174 configured for adjustment of the position and/or orientation of the LDE 172 relative to the base plate 150 prior to subsequent use. The LDE adjustment mechanism 174 provides adjustment around one, two or three rotation axes and adjustment along one, two or three translation directions. When an LDU 170 is used, the LPU subunit 140 is preferably rigidly attached to the base plate 150.

According to one aspect of the invention, the light projecting unit 141 further comprises a light deflection unit, LDU, 170 for deflecting light emitted by the light source 142. The LDU 170 is configured to change the position and/or orientation of the light plane 149 by deflecting light emitted by the light source 142. More in particular, the LDU 170 is configured to adjust and fix prior to subsequent use the position and/or orientation of the light plane 149 relative to the detection unit. The LDU 170 comprises a light deflection element, LDE, 172 configured for deflecting light and an LDE adjustment mechanism 174 configured to adjust and fix prior to subsequent use the position and/or orientation of the LDE 172.

The LDU 170 may be disposed after the light plane generating optics, thereby deflecting the light plane 149 as shown, for instance, in FIG. 6.

The LDU 170 may be disposed before the light plane generating optics 143, thereby deflecting the focused light as shown, for instance, in FIG. 7.

Figure 6A:
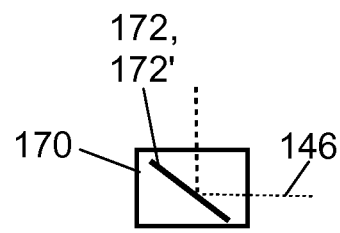
FIG. 6A: is a schematic illustration of light deflection unit, wherein the light deflection element is a mirror.
Figure 6B:
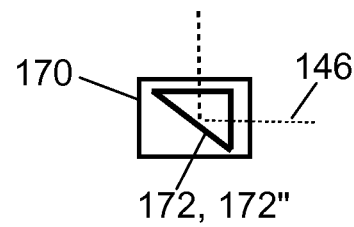
FIG. 6B: is a schematic illustration of light deflection unit, wherein the light deflection element is a prism.

LDU 170 comprises an LDE 172 configured for deflecting light. The LDE 172 may be a continuous beam breaker or a discrete beam breaker. The LDE 172 may be a mirror, prism, semi-transparent mirror, combination of lenses and diffractive optics, or a combination of these. FIG. 6A depicts a LDU 172 that is a mirror 172'. FIG. 6B depicts a LDU 172 that is a prism 172".

The position and/or orientation of the LDE 172 relative to the detection unit 120 may be adjustable and fixable prior to the subsequent use-in-service of the scanning probe 100. The LDE 172 is thus moveably attached to the base plate 150 during assembly of the light projecting unit 141. An LDE adjustment mechanism 174 allows movement of the LDE 172, during assembly, relative to the base plate 150 (and hence relative to the detection unit 120). The LDE adjustment mechanism 174 is configured to adjust or allow adjustment, and then to fix the position and orientation of the LDE 172 for subsequent use. Preferably, the LDE adjustment mechanism 174 is attached at one end to the base plate 150 and at another end to the LDE 172.

It is also appreciated that the LDE adjustment mechanism 174 may comprise plurality of separate LDE adjustment elements, each allowing for the adjustment of a different aspect of the position and/or orientation of the LDE 172. For instance, one LDE adjustment element may be configured for translation of the LDE 172 relative to the base plate 150 and hence detection unit 120. For instance, one LDE adjustment element may be configured for rotation of the LDE 172 relative to the base plate 150 and hence detection unit 120. One adjustment element may be configured for a yaw rotation of the LDE 172. These adjustment are also ones that are fixed prior to the subsequent use.

The LDE adjustment mechanism 174 holds the LDE 172 in a fixed position and orientation relative to the detection unit 120 prior to subsequent use. The position and orientation are typically held during the normal lifespan of the scanning probe 100. Prior to use, and during assembly of the optical scanning probe, the LDE adjustment mechanism 174 is utilised to change the position and/or orientation relative to the detection unit 120 in order to achieve the desired accuracy performance. After the adjustment has been made, the position and orientation is fixed for long term mechanical stability and invariance during mechanical or thermal excitation (e.g. during transport and normal use).

The adjustment preferably involves one of more of the following movements:

i) pivoting 166 of the LDE 172 about one or more (e.g. 1, 2) axes, relative to the base plate 150 and hence detection unit 120, ii) translation 162 of the LDE 172 relative to the base plate 150 and hence detection unit 120, iii) yaw rotation 164 of the LDE 172, preferably about a central axis of the angled LDE 172, relative to the base plate 150 and hence detection unit 120 (FIG. 8C), iv) rotation 164 of the light plane generating optics 143 its incoming beam, relative to the base plate 150 and hence detection unit 120

Adjustments i), ii) and iv) are preferred. The adjustments may be performed individually or simultaneously.

Preferably, pivoting 166 of the LDE 172 relative to the base plate 150 (i above) is about an axis perpendicular to the optical triangulation plane. Preferably, translation 162 of the LDE 172 relative to the base plate 150 (ii above) is in a direction that adjusts the distance between the LDE 172 and the detection unit 120. It may be along an axis perpendicular to the laser plane 149.

In order to achieve a fine tuning of these geometrical parameters, an external adjustment rig may be used. For the adjustment, both the base plate 150 and the LDE 172 may be mechanically connected to the adjustment rig. The rig may comprise a jig. The light source 142 (e.g. laser source) and the imaging sensor 122 are connected to an electronics board, so their function can be activated. Based on optical measurements, the translation and rotations are adjusted until the required performance is achieved. The adjustment preferably aligns the sensor lens assembly focal plane (object side) with the laser plane. In particular, the tuning of the focus, position, orientation, flatness and intensity profile may be performed manually by untightening the fixing screws, manipulation of the adjustment elements and tightening the screws again. This may be a single adjustment or an iterative process.

The manipulation of the adjustment elements may be assisted by an adjustment tool configured to operatively couple with the adjustment element. According to one embodiment of the invention, the LDE 172 or LDE adjustment mechanism 174 comprises one or more couplings for receiving an adjustment tool to assist with performing the adjustment. The coupling may take the form of a screw thread (male or female), a notch, a hole, a protrusion, rod or hook, for instance. The coupling may be configured for access outside the probe enclosure (e.g. it may have a rod shape). Particularly, the adjustment tool may comprise an elongate member, one end of which (effector end) is configured for attachment to the coupling on the LDE 172 or LDE adjustment mechanism 174, the other end of which (user end) receives force for transmission to the effector end. The elongate member acts as a lever to transmit large movements from the user end to the effector end where the movements are reduced in scale. The user end may be operatively attached to an arrangement of thumb screws on a supporting rig, the rotation of which adjust the position of the lever, allowing a very fine control of movements by the effector end and hence by the LDE 172 or LDE adjustment mechanism 174. The rig may comprise a plurality of such thumbscrews, arranged in different directions, depending on the movements required. As such, the position and orientation of the LDE 172 can be set.

Once the adjustments are done and confirmed by software tools, the geometrical position of the LDE 172 is locked using screws and/or adhesive. The adjustment is based on a number of optical characteristics which are tuned. Once the tuning is performed, the scanning probe is to be calibrated. The calibration preferably takes into account the remaining imperfections of the adjustment, as well as other non-adjustable imperfections for compensation by software. During the calibration the remaining imperfections of the optical configuration are identified using a more accurate reference instrument. The measured imperfections are translated into compensation values to improve the system performance during subsequent use.

The LDE adjustment mechanism 174 may be any, for instance, it may comprise a threaded rod to translate the LDE 172 and a threaded nut to lock the final position, or it may comprise a slotted guide to allow translation or pivoting of the LDE 172 and a screw that engages the slot to lock the final position, or it may comprise a (pivoted or revolute) joint to facilitate a movement that can be locked in position using an adhesive. Examples of suitable adhesives include bonding adhesives such as cyanoacrylates, epoxies and hot melts. The position of a bolt, nut or screw may be fixed for the lifetime of the scanning probe 100 using a thread-locking adhesive. Due to the type of integration of the scanning probe 100 into a measurement system, there may be restrictions to the maximal weight and size of the scanning probe 100, hence of the mechanical structure. A lightweight mechanical structure is preferred, which entails a simple system. The skilled person would understand that the adjustment mechanism combines fine adjustment, long term stability once fixed and low weight restrictions.

FIGS. 6 and 7, depict the main features of a scanning probe 100, namely, the detection unit 120, the LPU subunit 140 and mounting plate 110 attached to a base plate 150. The LPU subunit 140 is attached to the base plate 150 using a rigid mounting member 151, and the LDE 172 of the LDU 170 is attached to the base plate 150 using an LDE adjustment mechanism 174. FIGS. 8A to 8D depict one or more adjustment mechanisms.

FIG. 8A shows an LDE adjustment mechanism 174 and LDE 172 in a starting position. FIG. 8B indicates translational adjustments to the LDE 172 in which the fine dotted lines outline of the LDU 170 represent a starting position, and the solid lines of the LDU 170 represent its position after a translational adjustment. The translational adjustment may be achieved using a first support 176 attached to the base plate 150, which contains an aperture (e.g. square opening, slot, linear slot) for receiving a bolt, and a second support 178 attached to the LDE 172 which contains a hole for receiving the same bolt. The first and second supports form part of the LDE adjustment mechanism 174. The shaft of the bolt passes through both aperture and hole, but not the head or receiving nut. The first support can slide relative to the second support, its movements restricted by the slot to a translation. Once in position, the bolt may be tightened against the nut, adhesive applied to the thread, and LDE 172 locked into position relative to the base plate 150. It is noted that the aperture may be a square opening rather than a slot, so allowing translation of the first support relative to the second support in two dimensions.

FIG. 8C indicates rotational adjustments to the LDE 172, to effect a yaw rotation 164 of the LDE 172. Such a rotational adjustment may be achieved by employing a revolute joint between LDE 172 and the base plate 150. The LDE 172 can then rotate relative to the detection unit 120. Once in optimal position, the LDE 172 may be locked into position relative to the detection unit 120 using, for instance, an adhesive substance.

FIG. 8D indicates another rotational adjustment to the LDE 172, which is a pivoting (tilting) 166 movement relative to the base plate 150. The fine dotted lines outline of the LDU 170 represent a starting position, and the solid lines of the LDU 170 represent its position after a rotational (pivoting) adjustment. The rotational adjustment may be achieved by mounting the LDE 172 relative to the base plate using the first 176 and second 178 supports described above, whereby the first support 176 is disposed with a (square) aperture that permits movement in 2 directions. Alternatively, this may be achieved by mounting the LDE 172 relative to the base plate using a pivoted support such as a gimbal which provides rotation about a single axis. Where pivoting along two axes in required, a universal joint may be employed. The LDE 172 can be pivoted relative to the base plate 150. Once in position, the LDE 172 may be locked into position relative to the base plate 150 using, for instance, an adhesive substance.

It will be appreciated that other adjustments to the LDE 172 or to the LPU subunit 140 may be made to optimise the scanning probe 100. For instance, the focus of the collimator lens (e.g. collimator lens when the light source is a laser source) may be adjusted and then fixed. Specifically, the distance between the light source 142 (e.g. laser source) and the source optics 145 (e.g. collimating optics) may be adjusted and then fixed. Alternatively, or in addition, the light source 142 (e.g. laser source) may be displaceable relative to the source optics 145 (e.g. collimating optics); specifically, the light source 142 may be in sliding relation to the source optics 145 perpendicular to the optical axis of the source optics 145. Again, this adjustment may be made, and then fixed.

According to an aspect of the invention, the LPU comprises both types of adjustment mechanism 155, one 160 to adjust the LPU subunit 140 and one 174 to adjust the LDE 172.

For optimal performance of the scanning probe 100, the object focal plane of the sensor lens assembly 124 and the light plane 149 coincide. While the mechanical and optical components present in the scanning probe 100 may be manufactured to a high tolerance, their assembly will still necessitate adjustment or calibration to obtain the required optical performance. Thus, adjustment of optical components cannot be avoided. For systems of the art, the adjustment is mainly done by adjusting the focal plane of the sensor lens assembly 124. This may be realised using a threaded lens that turns in a threaded lens holder, so advancing or withdrawing the lens. Alternatively, it may be achieved using a cylindrical lens housing, that slides relative to a cylindrical lens holder. However, these threaded systems suffer from drift over time, owing to mechanical and thermal excitation. Moreover, due to an increase of size and weight of the sensor lens assembly (for obtaining reduced influence of speckle effects on the scanning probe performance for instance), the depth of field is reduced, making it more difficult for the focal plane and the laser plane to coincide and maintain this relative position in the long term.

Improved performance and accuracy of optical scanning probes is enabled by increasing the size and complexity of the optical system for transmitting and focussing light reflected from the surface of an object onto an imaging device (e.g. CMOS or CCD) within the probe. To improve the accuracy and performance of the scanning probe optical system, larger, more complex and heavier compound lenses are typically required. However the additional size, complexity and weight associated with such improved optical systems introduces mechanical instability during the probe's use, leading to a degradation of performance and accuracy particularly when the optical system is mounted in an adjustable enclosure as mentioned above.

Therefore mechanical instability is reduced by retaining the sensor lens assembly 124 as a static, non-adjustable element that is rigidly fixed to the base plate and adjusting the position and/or orientation of light plane 149. After optimal adjustment, the position of the laser unit is fixed so that it is a non-adjustable element during the lifespan of the instrument.

The present invention also provides a method for the assembly of a scanning probe 100 described herein, comprising the steps:
  adjusting the position and/or orientation of the projected light plane 149 relative to the detection unit 120, and
  fixing the position and/or orientation of the light plane 149 (prior to use).

The present invention also provides a method for the assembly of a scanning probe 100 described herein, comprising the steps:
  adjusting the position and/or orientation of the LDU subunit 140 relative to the detection unit 120, and
  fixing the position and/or orientation of the LDU subunit 140 (prior to use).

The present invention also provides a method for the assembly of a scanning probe 100 described herein, comprising the steps:
  adjusting the position and/or orientation of the LDE 172 relative to the detection unit 120, and
  fixing the position and/or orientation of the LDE 172 (prior to use).

The present invention concerns another method for the assembly of a scanning probe described herein, comprising the steps:
  fixing the position of the projected light plane 149 relative to a base plate 150,
  adjusting the position and/or orientation of the light plane 149 relative to the base plate 150 (and hence relative to detection unit 120) to optimise one of more of the focus, position, orientation, flatness and intensity profile of the image projected onto the image sensor, and
  fixing the position and/or orientation of the light plane 149 at the optimised position.

The present invention concerns another method for the assembly of a scanning probe described herein, comprising the steps:
- fixing the position of the detection unit 120 relative to a base plate 150,
- adjusting the position and/or orientation of the LPU subunit 140 relative to the base plate 150 (and hence relative to detection unit 120) to optimise one of more of the focus, position, orientation, flatness and intensity profile of the image projected onto the image sensor, and
- fixing the position and/or orientation of the LPU subunit 140 at the optimised position.

The present invention concerns another method for the assembly of a scanning probe described herein, comprising the steps:
- fixing the position of the detection unit 120 relative to a base plate 150,
- adjusting the position and/or orientation of the LDE 172 relative to the base plate 150 (and hence relative to detection unit 120) to optimise one of more of the focus, position, orientation, flatness and intensity profile of the image projected onto the image sensor, and
- fixing the position and/or orientation of the LDE 172 at the optimised position.

The method may further comprise adjusting the rotation angle of the stripe generated by light-plane generating optics 143. The rotation angle may be around the central (optical) axis 148 of the source optics assembly 144 relative to light source 142, and fixing the angle at the optimised position. The rotation angle may be around the axis of a light beam entering the light-plane generating optics 143. The rotation angle may be around an axis, perpendicular to the optical triangulation plane 147.

The steps are preferably performed by the manufacturer. The adjusting may be performed using an adjustment rig. After the fixing step, the scanning probe is calibrated. The probe is the calibrated for the lifetime of the instrument.

Figure 9:
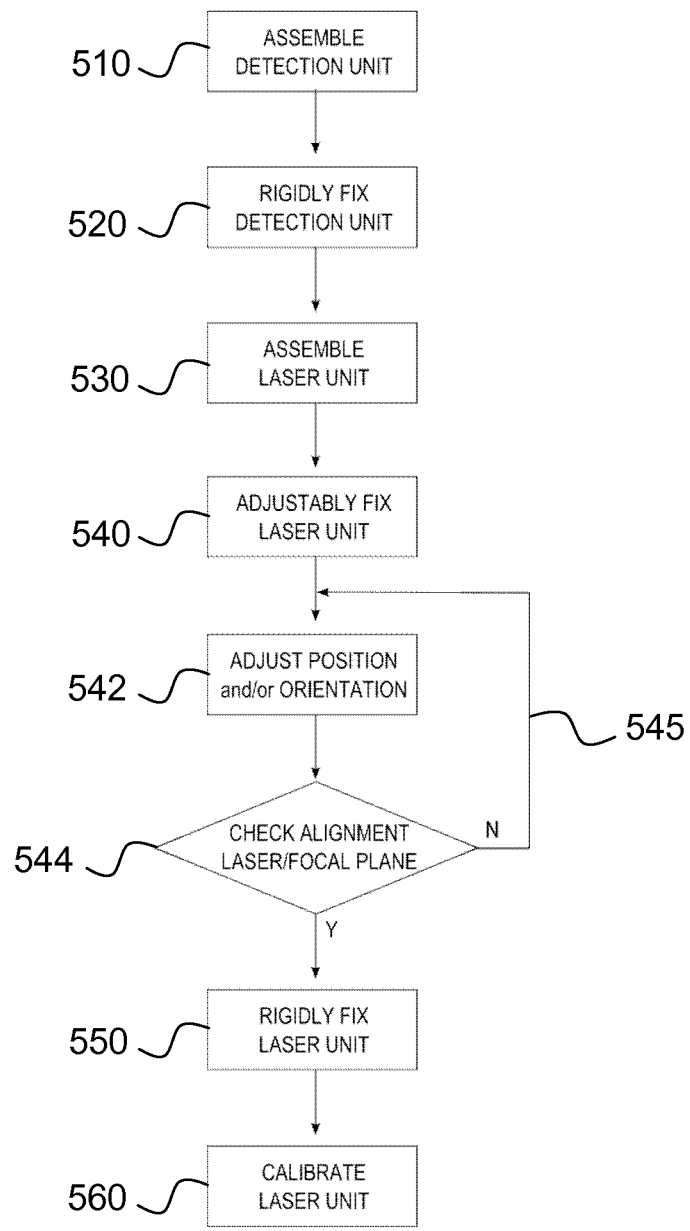
FIG. 9: Depicts a flow chart indicating steps for assembly of the scanning probe.

An example of a mechanical assembly procedure for a scanning probe is given in FIG. 9 that is a laser scanning probe. In order to improve image quality, the laser plane 149 is preferably accurately aligned with the object focal plane of the sensor lens assembly 124. To obtain such an accurate alignment, a mechanical adjustment procedure needs to be carried out. In a first step 510, the detection unit 120 is assembled. The sensor lens assembly 124 of the detection unit 120 is then rigidly fixed in step 520, for example to the base plate 150. Subsequently, the laser unit 140 (or LDU subunit 140) is assembled in step 530. However, in step 540, the laser unit 140 is adjustably fixed to the base plate 150, i.e. it is fixed in such a way that the position and/or orientation of the laser unit 140 can still be adjusted.

The final position and orientation of the laser unit 140 is fine-tuned until the laser plane 149 is optimally aligned with the focal plane of the sensor lens assembly 124, as can be derived from optical measurements. This fine-tuning can be performed through an iterative process 545 or may be performed directly in one step. The fine-tuning of the position and/or orientation of the laser unit 140 in step 542 may be done manually by untightening selected fixing screws, moving parts, and tightening the screws again, after which the alignment of the laser plane 149 with the focal plane is checked in step 544.

The fine-tuning may be performed through a coupling 161 (shown in FIG. 2), wherein the coupling 161 is configured to couple with an adjustment tool that operates the adjustment mechanism 160. The coupling 161 may protrude from the enclosure (not shown) for ease of re-adjustment during the lifetime of the scanning probe 100. For example, the coupling 161 may be a screw thread or rod as mentioned elsewhere herein, which couples to a tool and is actuated by an adjustment rig. Once the adjustments have been optimized and confirmed by optical measurements, optionally with the assistance of software tools, the final position and orientation of the source optics assembly 144 is locked in step 550. Preferably, the software tools provide feedback on the optical performance parameters during the adjustment of the adjustment mechanism 160. Once the mechanical assembly procedure is finished, a traditional optical calibration step 560 can be performed to optimize the optical parameters of the laser unit 140.

Figure 10:
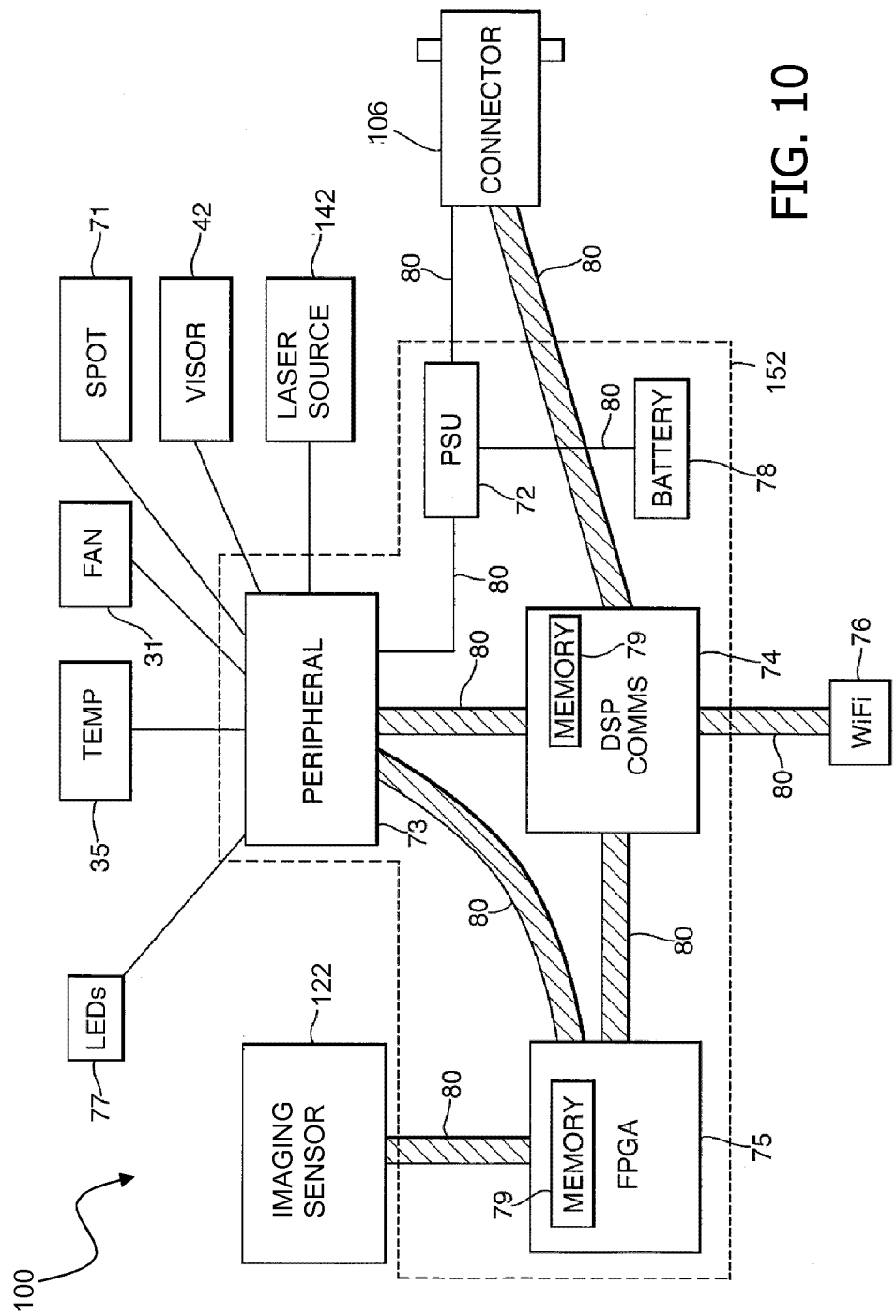
FIG. 10: Is a schematic illustration of possible components provided in a scanning probe according to the invention.

FIG. 10 is a diagram of an exemplary configuration for the electronics in the scanning probe 100. The processing unit 152 comprises four module PCBs: an FPGA module 75, a DSP or microcontroller module 74 for communications, a peripheral interconnection module 73 and a power supply module 72. The four modules are interconnected with power/data links 80. The imaging sensor 122 is connected to the FPGA module 75. The peripheral interconnection module 73 connects to the temperature sensor 35, the fan 31, the rangefinder laser spot 71, status LEDs 77, the visor detector 42 and the laser source 142. The DSP or microcontroller module 74 for communications links to a WiFi module 76. A battery 78 may be provided. The probe connector 106 links to the power/data links 80. Circuitry in the PSU module 72 may be provided for recharging the battery 78. Memory 79 is provided on the FPGA module 75 and the DSP or microcontroller module 74. The memory 79 can be both static and dynamic. The static memory 79 can be used for storing the program, identification, calibration, settings and other information such as usage history to aid maintenance. The settings in the static memory 79 may be changed by means of sending signals to the scanning probe 100 over the communications link. At least one accurate clock is provided for the purpose of time stamping synchronisation.

It will be understood by those skilled in the art that other embodiments of the electronics in the scanning probe 100 are possible. For instance, any or all of the modules in the processing unit 152 may be physically combined into a single module to suit packaging requirements. Any of the items 31, 35, 142, 77, 42, 71, 76 can be connected to or incorporated in any of the modules in the processing unit 152. One or more chips can be combined into one chip. The power/data links 80 may be configured in different arrangements to suit design requirements. The battery 78 may be permanent, rechargeable or replaceable.

The scanning system of FIG. 1 typically has four main connection/communication requirements:
- power/ground from localiser 200 or computer 300 to probe 100
- data communications between localiser 200 and computer 300
- synchronisation between probe 100 and localiser 200.
- data communication between probe 100 and computer 300.

A person skilled in the art may solve these connection/communication requirements using any effective combination of cables and wireless. The probe, computer and localiser may share a common data link such as Ethernet or Wifi, USB or Firewire. Alternatively or in addition, data may be transferred between the probe and computer using a serial digital interface (SDI) which digital interface is well known in the art. A scanning probe 100 may be used without cable attachment to a localiser 200. A cable for power and ground may not be present during use of the digital stripe scanning probe 100 when the battery 78 is used. Data communications can be carried out with standard high bandwidth radio communication links such as Wi-Fi. Where accurate clocks are present in both localiser 200 and digital stripe scanning probe 100, then radio synchronisation may be used periodically to check/adjust the two clocks. In between these clock checks, both localiser 200 and digital stripe scanning probe 100 may timestamp each of their data packets and the data streams can be merged in downstream software.

The scanning probe 100 may be synchronised in more than one way without any change required to the hardware or firmware of the scanning probe 100. Localisers 200 operate in various ways. Different types of synchronisation may be required for different localisers 200. Synchronisation of the digital stripe scanning probe 100 with the localiser 200 is important for accuracy. The digital stripe scanning probe 100 may have the provision for generating and receiving different types of synchronisation signal in which the digital stripe scanning probe 100 can be either master, or slave to the localiser 200, or slave to a master clock. Synchronisation signals include plain trigger signals and coded signals. Synchronisation signals can be real-time, pre-synchronised or post-synchronised. Pre- and post-synchronisation can make use of time stamping. Codes sent with a synchronisation signal can be quasi-unique identification codes and/or time stamp information. A small number of types of synchronisation are sufficient to cover nearly all localiser-probe synchronisation requirements. Different types of synchronisation may be provided in the digital stripe scanning probe 100. The operator sets the type of synchronisation to be used with a localiser by changing a setting in the digital stripe scanning probe 100. Embodiments are not limited to the types of synchronisation disclosed herein, and any form of synchronisation of digital stripe scanning probe 100 and localiser 200 is possible. A person skilled in the art may define the set of types of synchronisation to be used and the protocol/format.

In the embodiments described above, an LPU 141 and a single detector 120 are used. However multiple detectors may be used in conjunction with a single LPU subunit 140.

Alternatively, multiple detectors may be used with multiple LPU subunits 140—for example, each LPU subunit 140 may project planes or stripes at different orientations (e.g. parallel and crossing) and each detector may detect a respective stripe.

The scanning probe may comprise other features that reduce internal stresses on the components, for example, the internal wiring may be expandable; for example, the protective case may be attached in a way that forces are distributed around the base plate.

In the embodiments described above, the scanning probe is moved relative to the object to scan the object, and a localiser is used to determine the position of the scanning probe. However, instead, the scanning probe may be maintained in a stationary position and the object moved to known positions relative to the stationary probe. For example, the position of the object may be determined using one of the localisers described above.

Some Particular Embodiments of the Invention

One embodiment of the invention is scanning probe (100) for the dimensional acquisition of an object (400) by irradiating the object with light and detecting the reflected light comprising:

a detection unit (120) comprising an imaging sensor (122) and sensor lens assembly (124), a laser unit (140) comprising a laser source (142) and laser lens assembly (144) comprising stripe-generating optics (143), wherein the sensor lens assembly (124) comprises one or more lenses arranged in non-adjustable alignment with each other and with the imaging sensor (122), and wherein position and/or orientation of the laser unit (140) relative to the detection unit (120) is adjustable and fixable prior to subsequent use.

The position of the laser unit (140) relative to the detection unit (120) may be adjustable by translation of the laser unit (140) relative to the detection unit (120).

The orientation of the laser unit (140) relative to the detection unit (120) may be adjustable by a pivot of the laser unit (140) relative to the detection unit (120), preferably along an axis perpendicular to the optical triangulation plane (147), which optical triangulation plane (147) is defined by the central axis of the (148) of the laser lens assembly (144) and the central axis of the (126) of the sensor lens assembly (124). The orientation of the stripe-generating optics (143) relative to the laser source (142) may be adjustable and fixable prior to subsequent use. The orientation of the stripe-generating optics (143) may be adjustable by rotation, along the central axis of the (148) of the laser lens assembly (124), of the stripe generating optics (143) relative to the laser source (142). The detection unit (120) and the laser unit (140) may be attached to a rigid base plate (150). The detection unit (120) may be rigidly attached to the rigid base plate (150). The laser unit (140) may be attached to the rigid base plate (150) using an adjustment mechanism (160) configured for adjustment of the position and/or orientation of the laser unit (140) relative to the base plate (150) prior to subsequent use. A central axis (126) of the sensor lens assembly (124) and the triangular laser plane (149) projected by the laser unit (140) may form an acute angle, preferably between 15 and 45 deg. A central axis (126) of the sensor lens assembly (124) and the central axis of the laser lens assembly (148) may not be parallel, and preferably bisect at an acute angle. The sensor lens assembly (124) may comprise at least two lens elements, at least one of which is inclined with respect to the central axis of the optical system, and at least one of which is perpendicular to the central axis of the optical system. The laser unit (140) or a support attached thereto may be disposed with a coupling (161) for receiving an adjustment tool for adjusting the position and/or orientation of the laser unit (140).

Another embodiment of the invention relates to a method for assembly of a scanning probe (100) as defined in any of claims 1 to 12 comprising:

adjusting the position and/or orientation of the laser unit (140) relative to the detection unit (120), and fixing the position and/or orientation of the laser unit (140).

The adjusting may be performed using an adjustment rig that couples to the laser unit (140).

The invention claimed is:

1. A scanning probe for the dimensional acquisition of an object by irradiating the object with light and detecting reflected light comprising:

an imaging sensor and a sensor lens assembly for detecting the reflected light, wherein the sensor lens assembly comprises one or more lenses, wherein all the lenses in the sensor lens assembly are arranged in permanent non-adjustable alignment with each other, a light source for generating light, source optics for focusing the light, and light plane generating optics for generating a light plane for irradiating the object, wherein one or both of a position and an orientation of the light plane is adjustable such that it coincides with an object-side imaging plane of the sensor lens assembly and wherein the adjustment to the light plane is fixable for operational stability, and wherein the sensor lens assembly is rigidly and non-adjustably attached to a rigid base plate to which the source optics are also attached, which rigid base plate is configured for mounting the scanning probe onto a localizer.

2. Probe according to claim 1, wherein the numerical aperture of the sensor lens assembly at the object side is greater than 0.08.

3. Probe according to claim 1, wherein the central axis of the sensor lens assembly and the light plane form an acute angle.

4. Probe according to claim 1, wherein the sensor lens assembly comprises at least two lens elements, at least one of which is inclined with respect to the central axis of the optical system, and at least one of which is aligned with the central axis of the optical system.

5. Probe according to claim 1, wherein the source optics and light plane generating optics are comprised within a source optics assembly, and a central axis of the sensor lens assembly and a central axis of the source optics assembly are not parallel.

6. Probe according to claim 1, wherein one or both of a position and an orientation of the source optics is adjustable and fixable relative to the imaging sensor thereby adjusting and fixing one or both of the position and orientation of the light plane relative to the imaging sensor.

7. Probe according to claim 6, wherein an orientation of the light plane is adjustable by a pivot of the source optics relative to the imaging sensor.

8. Probe according to claim 1, further comprising a light deflection unit, LDU, for deflecting light, said LDU configured to adjust and fix one or both of a position and an orientation of the light plane relative to the imaging sensor.

9. Probe according to claim 8, wherein the LDU is disposed before the light plane generating optics, thereby deflecting the focused light, or after the light plane generating optics, thereby deflecting the light plane.

10. Probe according to claim 8, wherein the LDU comprises a light deflecting element, LDE, for deflecting the light that can adjust one or both of a position and an orientation of the light deflecting element relative to the base plate.

11. Method for assembly of a scanning probe comprising an imaging sensor and a sensor lens assembly, wherein the sensor lens assembly comprises one or more lenses and all the lenses in the sensor lens assembly are arranged in permanent non-adjustable alignment with each other, a light source for generating light, and source optics for focusing the light, and light plane generating optics for generating a light plane, comprising the steps:

adjusting one or both of a position and an orientation of the light plane such that an object-side imaging plane of the sensor lens assembly coincides with the light plane, and fixing the light plane such that its position and orientation are fixable for operational stability.

12. Method for assembly of a scanning probe comprising an imaging sensor and a sensor lens assembly, wherein the sensor lens assembly comprises one or more lenses, wherein all the lenses in the sensor lens assembly are arranged in permanent non-adjustable alignment with each other, and a light source for generating light, source optics for focusing the light, light plane generating optics for generating a light plane and an adjustable light deflection unit, LDU configured to adjust and fix one or both of a position and an orientation of the light plane relative to the imaging sensor by deflection comprising the steps:

adjusting the LDU deflection such that an object side imaging plane of the sensor lens assembly coincides with the light plane, and fixing the LDU such that the position and orientation of the light plane are fixed for operational stability.

13. Method according to claim 11, wherein the adjusting is performed using an adjustment rig that couples to at least the source optics.

14. Method according to claim 12, wherein the adjusting is performed using an adjustment rig that couples to at least the source optics.

15. Probe according to claim 3, wherein the central axis of the sensor lens assembly and the light plane form an angle between 15 and 45 deg.

16. Probe according to claim 5, wherein the central axis of the sensor lens assembly and the central axis of the source optics assembly bisect at an acute angle.

17. Probe according to claim 7, wherein the orientation of the light plane is adjustable by a pivot of the source optics relative to the imaging sensor around an axis perpendicular to an optical triangulation plane, which optical triangulation plane is defined by a central axis of the source optics assembly and a central axis of the sensor lens assembly.

18. Probe according to claim 10, wherein the adjustment of the light deflecting element relative to the base plate is around one, two or three rotation axes and along one, two or three translation directions.

19. A scanning probe for the dimensional acquisition of an object by irradiating the object with light and detecting reflected light comprising:

an imaging sensor and a sensor lens assembly for detecting the reflected light, wherein the sensor lens assembly comprises one or more lenses, wherein all the lenses in the sensor lens assembly are arranged in permanent non-adjustable alignment with each other, a light source and light plane generating optics for generating a light plane for irradiating the object, wherein one or both of a position and an orientation of the light plane is adjustable, and wherein the sensor lens assembly is rigidly and non-adjustably attached to a rigid base plate to which the source optics are also attached, which rigid base plate is configured for mounting the scanning probe onto a localizer.

* * * * *